United States Patent
Sagar et al.

(10) Patent No.: US 11,027,656 B1
(45) Date of Patent: Jun. 8, 2021

(54) FLEXIBLE HUB FOR HANDLING MULTI-SENSOR DATA

(71) Applicant: TEXAS INSTRUMENTS INCORPORATED, Dallas, TX (US)

(72) Inventors: Rajat Sagar, Allen, TX (US); Mihir Narendra Mody, Bengaluru (IN); Anthony Joseph Lell, San Antonio, TX (US); Gregory Raymond Shurtz, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/709,548

(22) Filed: Dec. 10, 2019

(51) Int. Cl.
| | |
|---|---|
| *H04N 21/2343* | (2011.01) |
| *B60R 1/00* | (2006.01) |
| *H04N 5/225* | (2006.01) |

(52) U.S. Cl.
CPC .............. *B60R 1/00* (2013.01); *H04N 5/2251* (2013.01); *B60R 2300/102* (2013.01); *B60R 2300/301* (2013.01); *B60R 2300/408* (2013.01); *B60R 2300/607* (2013.01); *B60R 2300/8026* (2013.01); *B60R 2300/8093* (2013.01)

(58) Field of Classification Search
CPC ... H04N 13/161; H04N 21/2343; H04B 10/40
See application file for complete search history.

(56) References Cited

U.S. PATENT DOCUMENTS

| | | | | | |
|---|---|---|---|---|---|
| 4,228,535 | A | * | 10/1980 | Workman | H04Q 11/06 370/220 |
| 5,566,127 | A | * | 10/1996 | Hoshizaki | G11C 7/1006 365/230.06 |
| 7,383,235 | B1 | * | 6/2008 | Ulyanov | B82Y 10/00 706/13 |
| 9,509,310 | B1 | | 11/2016 | Goumballa et al. | |
| 9,621,254 | B2 | * | 4/2017 | Chang | H04W 4/90 |

(Continued)

FOREIGN PATENT DOCUMENTS

KR 20130094113 8/2013

OTHER PUBLICATIONS

Nikolic, Zoran et al. "TI Gives Insight to Vision-Enabled Automotive Technologies." Texas Instruments White Paper. Oct. 2013. pp. 1-12.

(Continued)

*Primary Examiner* — Paulos M Natnael
(74) *Attorney, Agent, or Firm* — Brian D. Graham; Charles A. Brill; Frank D. Cimino (57) ABSTRACT

A hub that receives sensor data streams and then distributes the data streams to the various systems that use the sensor data. A demultiplexer (demux) receives the streams, filters out undesired streams and provides desired streams to the proper multiplexer (mux) or muxes of a series of muxes. Each mux combines received streams and provides an output stream to a respective formatter or output block. The formatter or output block is configured based on the destination of the mux output stream, such as an image signal processor, a processor, memory or external transmission. The output block reformats the received stream to a format appropriate for the recipient and then provides the reformatted stream to that recipient.

24 Claims, 12 Drawing Sheets

(56) References Cited

U.S. PATENT DOCUMENTS

| | | | |
|---|---|---|---|
| 2005/0259514 A1* | 11/2005 | Iseli | G01V 1/223 367/79 |
| 2008/0242258 A1* | 10/2008 | Lim | H04N 21/4345 455/344 |
| 2009/0029670 A1* | 1/2009 | Cho | G01C 21/00 455/344 |
| 2009/0284620 A1* | 11/2009 | Lablans | H04N 5/775 348/231.3 |
| 2010/0254705 A1* | 10/2010 | Perkins | H04J 14/0204 398/48 |
| 2014/0050485 A1* | 2/2014 | Masarik | H04B 10/40 398/117 |
| 2015/0067748 A1* | 3/2015 | Kang | H04N 21/4108 725/110 |
| 2015/0304648 A1 | 10/2015 | Gulati et al. | |
| 2018/0109755 A1 | 4/2018 | Vaid et al. | |
| 2019/0250611 A1 | 8/2019 | Costin et al. | |
| 2020/0120458 A1* | 4/2020 | Aldana | H04W 28/22 |

OTHER PUBLICATIONS

NPX Semiconductors. "MIPI-CSI2 Peripheral on i.MX6 MPUs." Application Note, Document No. AN5305, Rev. 0, Jul. 2016. pp. 1-32.

Texas Instruments. "AM65x/DRA80xM Processors." Technical Reference Manual. Literature No. SPRUID7D, Apr. 2018—Revised Jun. 2019. pp. 1-9, 565-592, 10748-10802.

International Search Report for PCT/US2020/064149 dated Feb. 25, 2021.

\* cited by examiner

FLEXIBLE HUB FOR HANDLING MULTI-SENSOR DATA

BACKGROUND

1. Field

The field relates to processing sensor input data in system on a chip (SoC) devices.

2. Description of the Related Art

Electronics use in automobiles is increasing daily. In addition to the conventional engine controller, transmission controller, infotainment unit, body controller and the like, the advent of numerous safety and autonomous systems are greatly increasing the processing done inside an automobile. For example, adaptive cruise control may entail intercommunication between a radar system, an engine controller and a transmission controller. As another example, in a bird's eye view display, outputs from a number of different cameras arranged at various locations are provided to a processor to process the received video and develop the resultant bird's eye view image, which is then provided to the infotainment system for display to the driver. This increase in the number and type of input sensors places large burdens on the SoC devices that receive the sensor data. Additionally, the sensor data is often used by multiple processes, increasing the demands on the SoC devices. The burden is further complicated because of the reliability requirements for the safety systems that use the sensor data.

SUMMARY

In an example, a hub is provided to receive sensor data and then distribute the data to the various systems that use the sensor data. A demultiplexer (demux) receives the streams, filters out undesired streams and provides desired streams to the proper multiplexer (mux) or muxes of a series of muxes. Each mux combines received streams and provides an output stream to a respective formatter or output block. The formatter or output block is configured based on the destination of the mux output stream, such as an image signal processor, a processor, memory or external transmission. The output block reformats the received stream to a format appropriate for the recipient and then provides the reformatted stream to that recipient.

By providing streams directly to the one or more recipients in the format appropriate for each recipient, rather than providing the streams to DRAM and then having each recipient obtain its own stream or streams and perform its own reformatting operation, delay in operating on the stream is reduced and DRAM bandwidth issues are reduced.

BRIEF DESCRIPTION OF THE FIGURES

For a detailed description of various examples, reference will now be made to the accompanying drawings in which.

DETAILED DESCRIPTION

Figure 1:
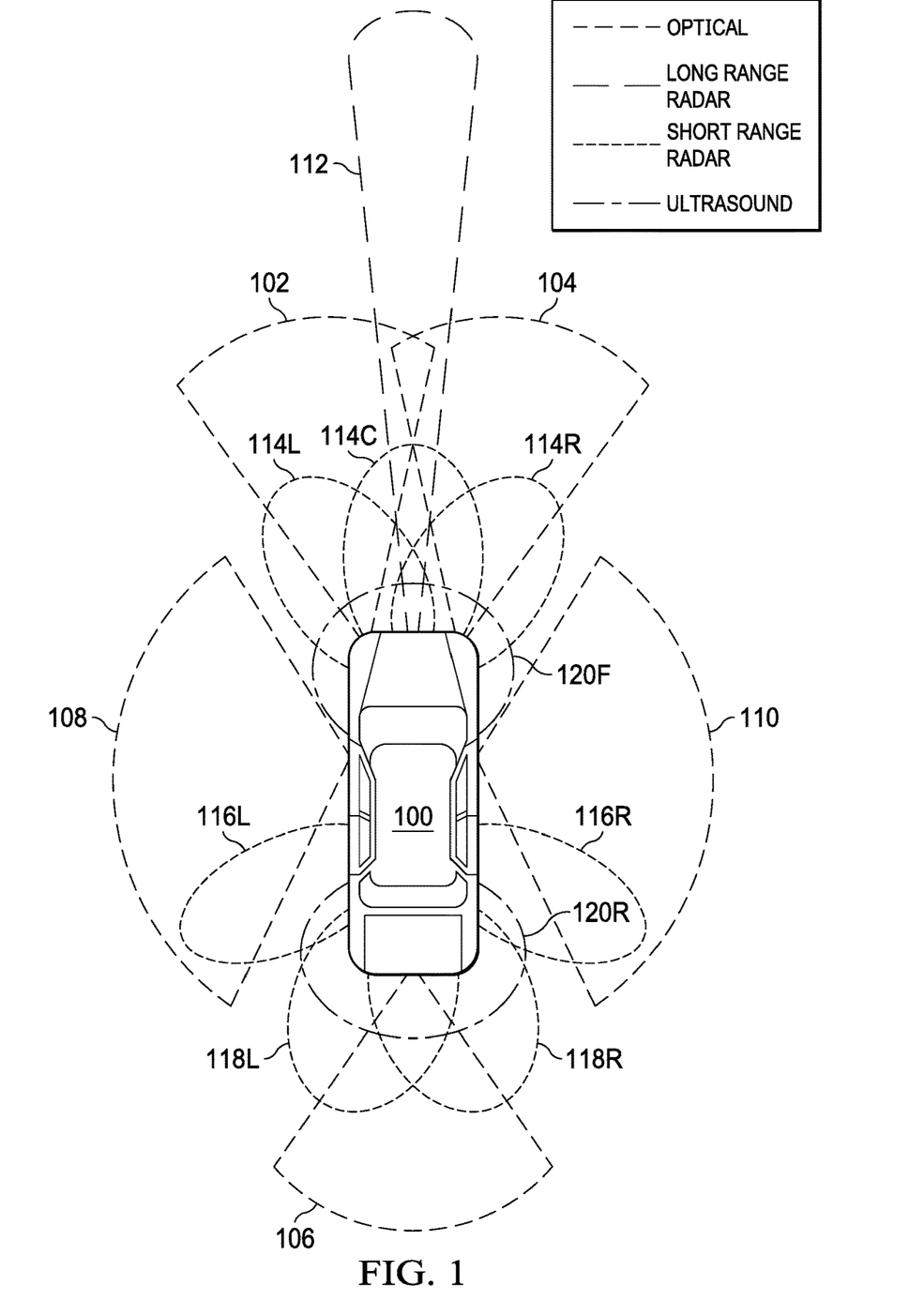
FIG. 1 is a drawing of a vehicle and the fields of view of various optical and radar sensors.

Referring now to FIG. 1, a vehicle 100 is shown. The vehicle 100 includes a set of cameras, other optical sensors, radar sensors, ultrasound sensors, and/or other suitable sensors. In various examples, the optical sensors include left camera 102 and right camera 104, which provide a stereo image from the front of the vehicle 100 for lane departure warnings, traffic sign recognition and collision alert. A rear camera 106 provides a rear view for parking assistance. A left side camera 108 provides a left-side view and a right camera no provides a right-side view. The captured images of the cameras 102, 104, 106, 108, no are combined to provide a bird's eye view.

Examples of radar sensors include a long-range radar 112 provided at the front of the vehicle 100 for adaptive cruise control. Three shorter range radar units 114L, 114C and 114R are provided at the front of the vehicle 100 enable cross traffic alert and front collision alert. Radar units 116L and 116R are provided at the left and right side of the vehicle 100 for blind spot detection. Radar units 118L and 118R are provided at the rear of the vehicle 100 for rear collision alert. Exemplary ultrasound units 120F and 120R are provided at the front and rear of the vehicle 100 for parking assistance. These camera, radar, and ultrasound sensors provide the inputs to various advanced driver assistance systems (ADAS). These sensors are just examples and many other sensors, such as LIDAR (light detecting and ranging) sensors and the like can be used as well.

Figure 2:
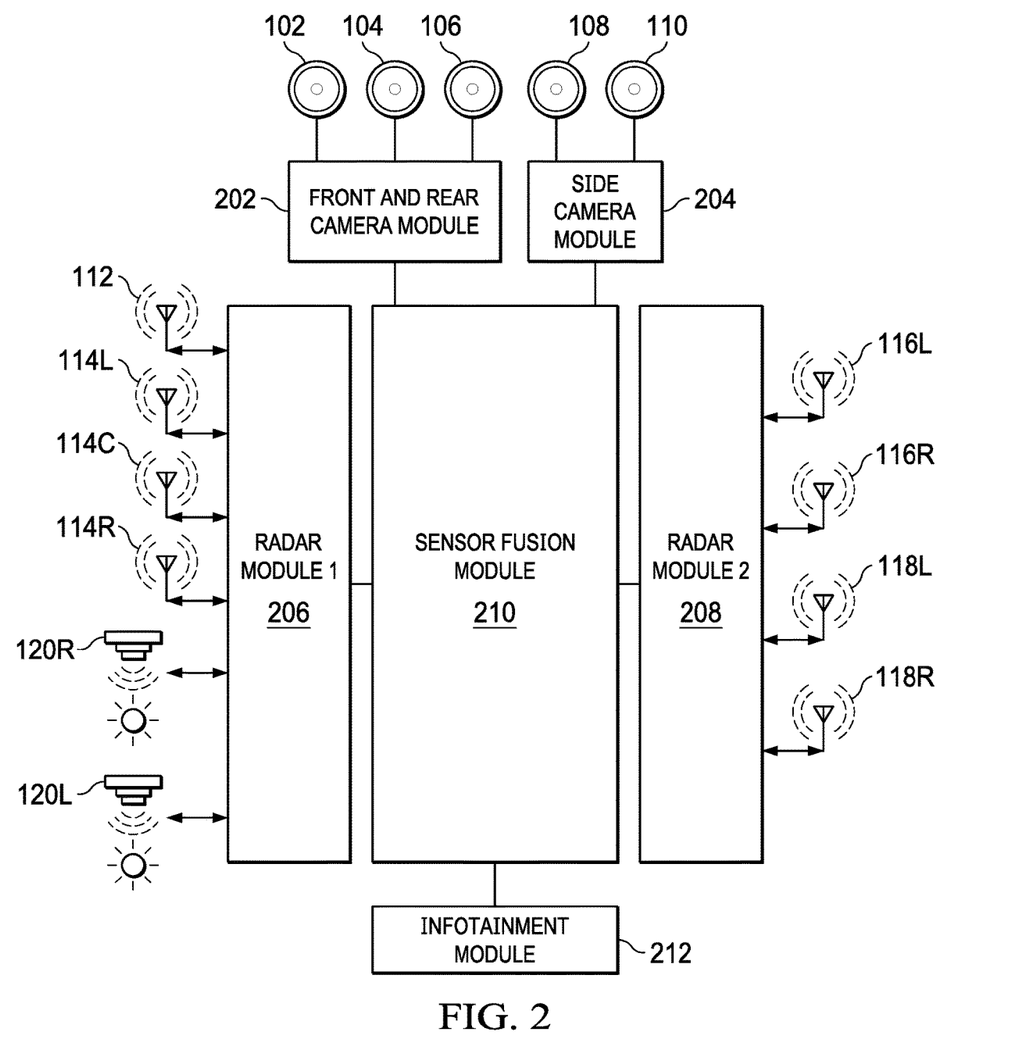
FIG. 2 is a block diagram of the vehicle of FIG. 1 including the optical and radar sensors according to some examples.

Referring now to FIG. 2, the systems and sensors of the vehicle 100 are shown. In the example, cameras 102, 104 and 106 are connected to a front and rear camera module 202. Cameras 108 and no are connected to a side camera module 204. Long range radar 112 and front radar units 114L, 114C, and 114R are connected to a first radar module 206. Ultrasound detectors 120R and 120L are also connected to the first radar module 206. Radar units 116L, 116R, 118L and 118R are connected to a second radar module 208. The front and rear camera module 202, the side camera module 204, the first radar module 206 and the second radar module 208 are connected to a sensor fusion module 210 which integrates the various sensor outputs developed by the other modules. An infotainment module 212 is connected to the sensor fusion module 210 to allow the driver of the car to see produced images such as a 360° bird's eye view or receive warnings when close to an obstacle. It is understood that more or fewer sensors can be connected to a given module and multiple sensor types can be provided to a single module.

Figure 3:
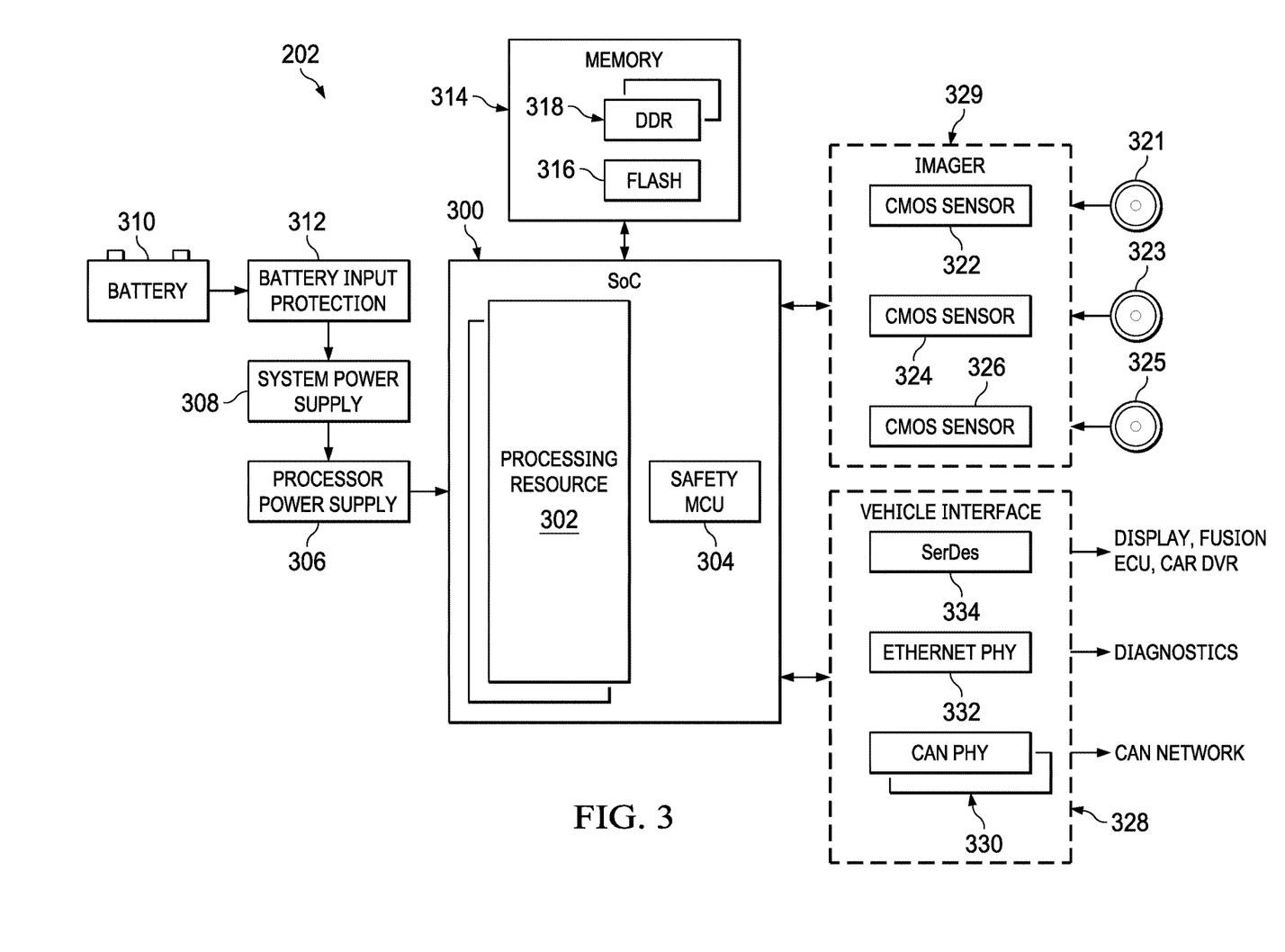
FIG. 3 is a block diagram of an optical sensor system of FIG. 2.

FIG. 3 illustrates the front and rear camera module 202 according to some examples. An SoC 300 forms the digital processing element of the front and rear camera module 202. The SoC 300 includes a processing resource 302. The processing resource 302 may include any number of interconnected processing devices ranging from cores to discrete processors and may include general purpose processing devices, digital signal processors, application-specific processors, controllers, and/or other suitable processing devices. The SoC 300 may also include a safety microcontroller (MCU) 304. A processor power supply 306 provides power to the SoC 300 and receives power from a system power supply 308. The system power supply 308 receives power from a battery 310 via battery input protection circuitry 312. Memory 314, which includes flash memory 316 and DRAM 318, is connected to the SoC 300. The flash memory 316 is non-volatile memory used to store program instructions to operate the module, including instructions to perform the functional safety and performance monitoring done by the processors, as described below. The optics 321, 323, 325 of each camera 102, 104, 106 provide light to a respective CMOS sensor 322, 324, 326 in an imager block 329. The outputs of the CMOS sensors 322, 324 and 326 are provided to the SoC 300 to provide the optical inputs. In an example the outputs are provided as Mobile Industry Processor Interface (MIPI) Alliance Camera Serial Interface 2 (MIPI CSI-2) conformant data streams. In an example the individual sensor CSI-2 data streams are provided to a CSI-2 aggregator, which combines the individual streams into a multiplexed single output stream, the individual streams becoming different virtual channels on the CSI-2 output. A vehicle interface block 328 includes a controller area network (CAN) bus PHY 330 for connection to a CAN bus network in the vehicle 100, an Ethernet PHY 332 for connection as required inside the vehicle 100 and a SerDes 334 used for connecting to various other elements in the vehicle 100 such as the sensor fusion module 210. The vehicle interface block 328 is connected to the SoC 300.

Figure 4:
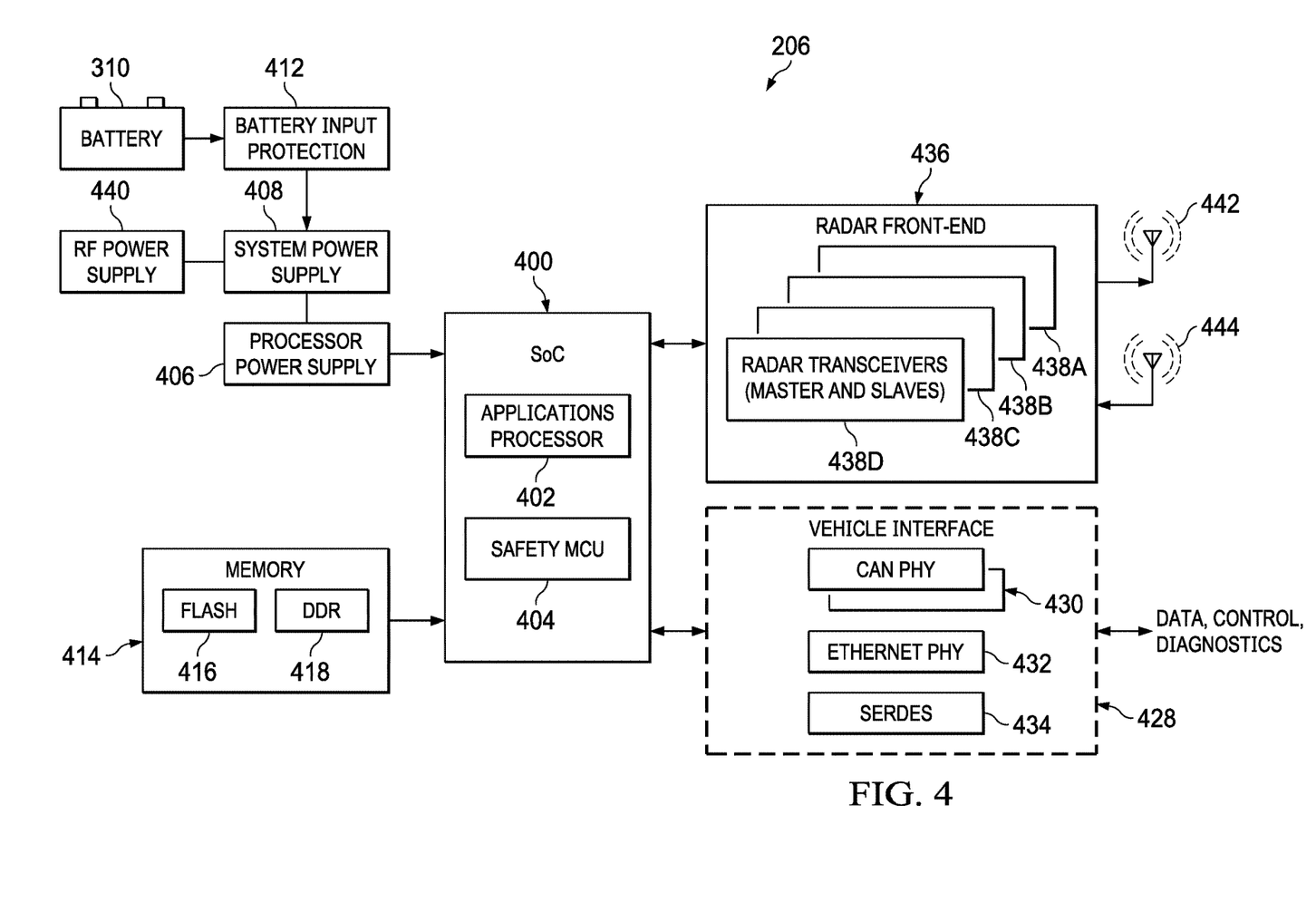
FIG. 4 is a block diagram of a radar sensor system of FIG. 2.

FIG. 4 illustrates a radar module 208 according to some examples. An SoC 400 contains the relevant processors 402 and the safety MCU 404. Processor power supply 406 is connected to the SoC 400 and receives its power from a system power supply 408. A battery 310 is connected to a battery input protection module 412, which provides its output to the system power supply 408. An RF power supply module 440 is connected to the system power supply 408. A memory 414, including flash memory 416 and DRAM 418, is connected to the SoC 400. The flash memory 416 is non-volatile memory used to store program instructions to operate the module, including instructions to perform the functional safety and performance monitoring done by the processors, as described below. Similarly, a vehicle interface block 428, including a CAN bus PHY 430, an Ethernet PHY 432 and a SerDes 434, is connected to the SoC 400 to provide connections for the module 206. A radar front end module 436 contains the individual radar transceivers 438A-D that correlate to the individual radar units 116L, 116R, 118L and 118R. The radar front end module 436 is connected to transmit 442 and receive 444 antennas. The radar front end module 436 is also connected to the SoC 400 and in an example provides a CSI-2 data steam to the SoC 400, each radar transceiver 438A-D being on a different virtual channel.

Figure 5:
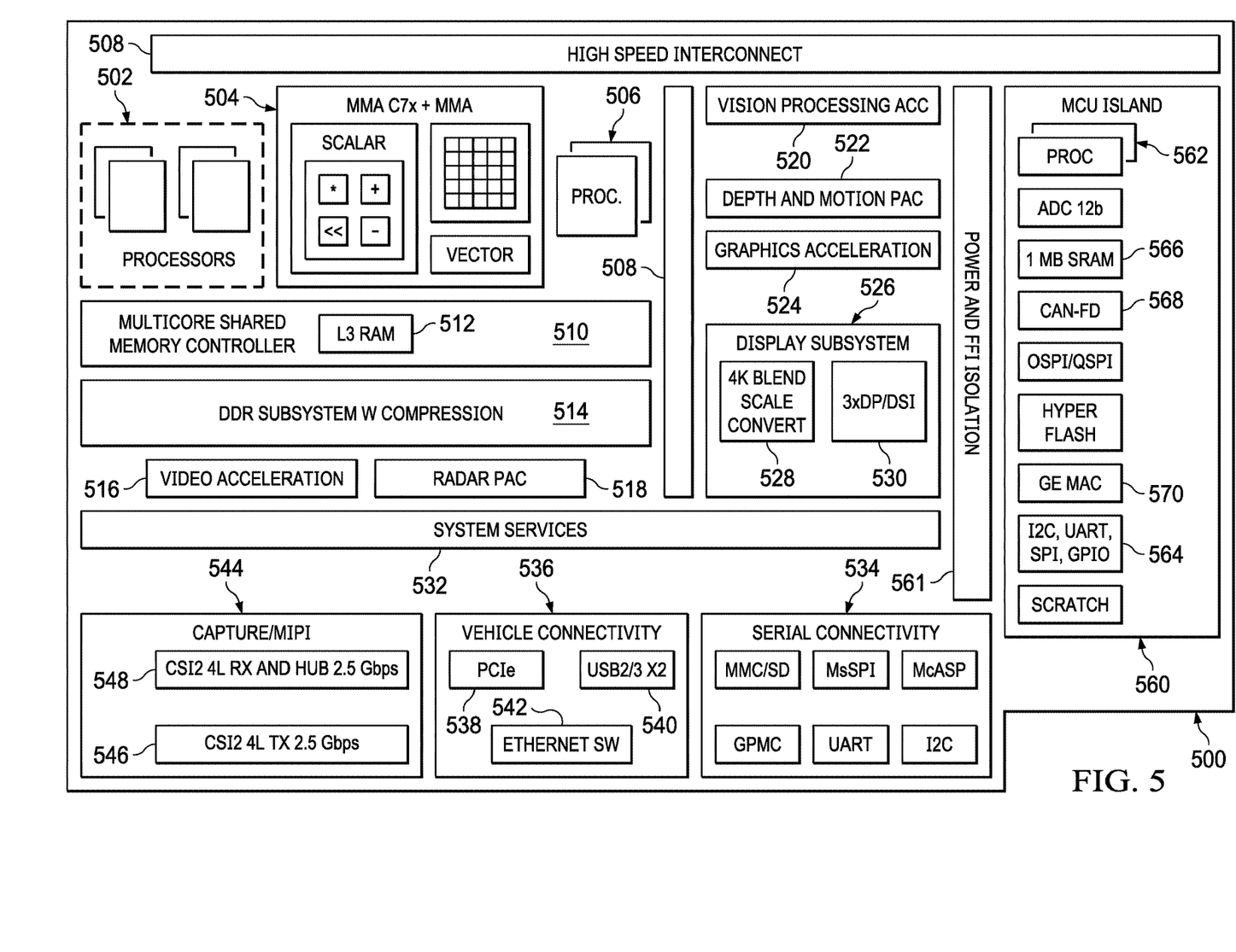
FIG. 5 is a block diagram of an SoC as used in the sensor systems of FIGS. 3 and 4.

FIG. 5 is a block diagram of an exemplary SoC 500, such as SoC 300 or SoC 400. A series of more powerful microprocessors 502, such as ARM® A72 or A53 cores, form the primary general-purpose processing block of the SoC 500, while a digital signal processor (DSP) 504 provides specialized computing capabilities. These microprocessors 502 and the DSP 504 are the processor 302 and the processor 402. A simpler microprocessor 506, such as an ARM R5F core, provides general control capability in the SoC 500. A high-speed interconnect 508 connects the microprocessors 502, DSP 504 and microprocessor 506 to various other components in the SoC 500. For example, a shared memory controller 510, which includes onboard RAM 512, is connected to the high-speed interconnect 508 to act as the onboard RAM for the SoC 500. A DDR memory controller system 514 is connected to the high-speed interconnect 508 and acts as an external interface to external DRAM. A video acceleration module 516 and a radar processing accelerator (PAC) module 518 are similarly connected to the high-speed interconnect 508. A vision processing accelerator module 520 is connected to the high-speed interconnect 508, as is a depth and motion PAC module 522. A graphics acceleration module 524 is connected to the high-speed interconnect 508. A display subsystem 526 is connected to the high-speed interconnect 508 and includes conversion logic 528 and output logic 530 to allow operation with and connection to various video monitors. A system services block 532, which includes items such as DMA controllers, memory management units, general-purpose I/O's, mailboxes and the like, is provided for normal SoC 500 operation. A serial connectivity module 534 is connected to the high-speed interconnect 508 and includes modules as conventional in an SoC. A vehicle connectivity module 536 provides interconnects such as PCIe block 538, USB block 540 and an Ethernet switch 542. A capture/MIPI module 544 includes a four-lane CSI-2 compliant transmit block 546 and a four-lane CSI-2 receive module and hub 548. Further details on the CSI-2 receive module and hub 548 are provided below.

An MCU island 560 is provided as a secondary subsystem and handles operation of the integrated SoC 500 when the other components are powered down to save energy. The MCU island 560 also operates as the safety MCU 304, 404. An MCU ARM processor 562 operates as a master and is coupled to the high-speed interconnect 508 through an isolation interface 561. An MCU general purpose I/O (GPIO) block 564 operates as a slave. MCU RAM 566 is provided to act as local memory for the MCU ARM processor 562. A CAN bus block 568 is connected to allow operation with a conventional CAN bus environment in the vehicle 100. An Ethernet MAC (media access control) block 570 is provided for further connectivity in the vehicle 100. Nonvolatile memory (NVM), such as the flash memory 316 or 416, is connected to the MCU ARM processor 562.

It is understood that this is one example of an SoC provided for explanation and many other SoC designs are possible, with varying numbers of processors, DSPs, accelerators and the like.

Figure 6:
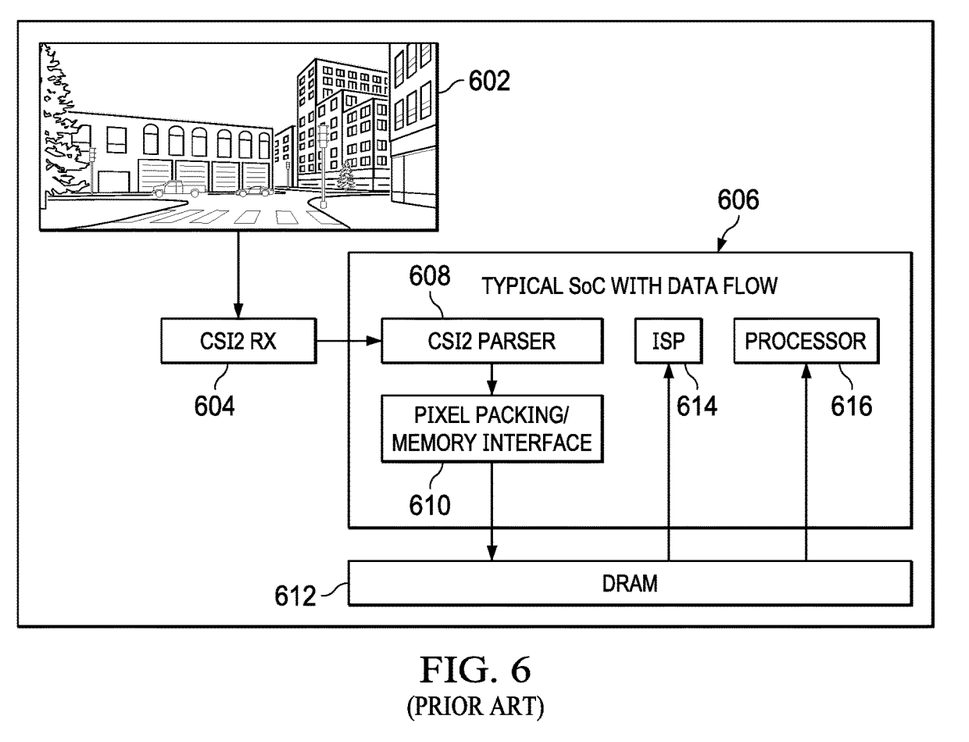
FIG. 6 is a block diagram and sensor data flow in an SoC according to the prior art.

FIG. 6 illustrates operation of a sensor module according to the prior art. A camera 602 provides an output sensor data stream to a CSI-2 receiver (RX) module 604, which in turn provides its output sensor data stream to an SoC 606, and more particularly to a CSI-2 parser 608 in the SoC 606. The CSI-2 parser 608 examines the input sensor data stream to validate packets and to provide signals to separate virtual channels. The output sensor data stream of the CSI-2 parser 608 is provided to a pixel packing and memory interface module 610 so that the data from the camera 602 is directly stored in DRAM 612. An image system processing (ISP) block 614 is connected to the DRAM 612 to receive a sensor data stream from the camera 602 that has been stored in the DRAM 612. Similarly, a processor 616 is connected to the DRAM 612 to receive the camera 602 data. The various users of the data, such as the ISP block 614 and the processor 616, must individually connect to the DRAM 612 and retrieve the desired sensor data or use a DMA channel to retrieve the sensor data. This results in both a delay in operations, as the sensor data stream must be stored DRAM 612, retrieved and reformatted, and a possible bottleneck, should the number of systems requesting data exceed the available bandwidth of the DRAM 612. The limited and inflexible nature of this configuration limits the number of sensors that can be connected to a particular SoC 606 and limits the performance of the sensors of the SoC 606 to lesser limits because of the convoluted data path.

Figure 7:
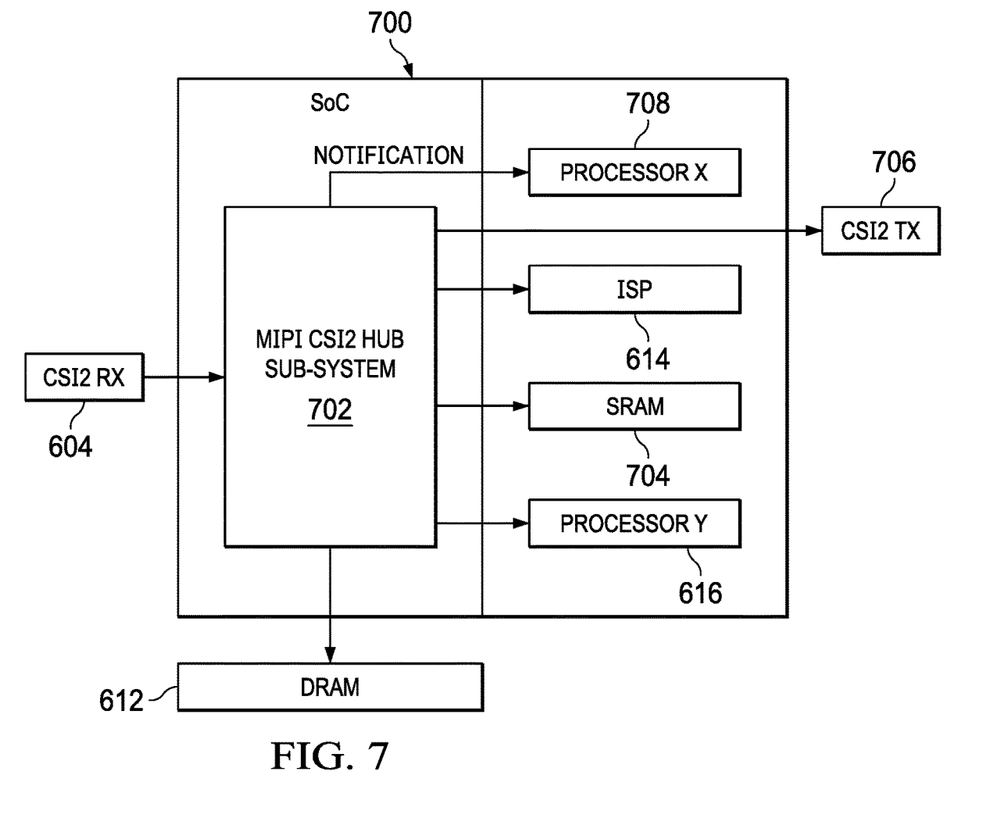
FIG. 7 is a block diagram and sensor data flow in an SoC including a hub for distributing sensor data.

In FIG. 7, a CSI-2 RX module 604, which receives sensor data from modules such as the imager block 329 or radar front end module 436, is connected to an SoC 700, and more particularly to a hub subsystem 702, such as the CSI-2 receive module and hub 548, inside the SoC 700. The hub subsystem 702 distributes the data received from the CSI-2 RX module 604 to any or all of DRAM 612, ISP block 614, processor 616 or SRAM 704. Additionally, an output of the hub subsystem 702 can be provided to a CSI-2 transmit (TX) module 706 to allow sensor data to be provided to a different SoC for use and processing. The hub subsystem 702 provides notifications to a processor X 708. Processor Y 616 and processor X 708 can be any processors in the SoC 700. For instance, in one example processor Y 616 is the microprocessors 502 while the processor X 708 is the microprocessor 506.

Figure 8:
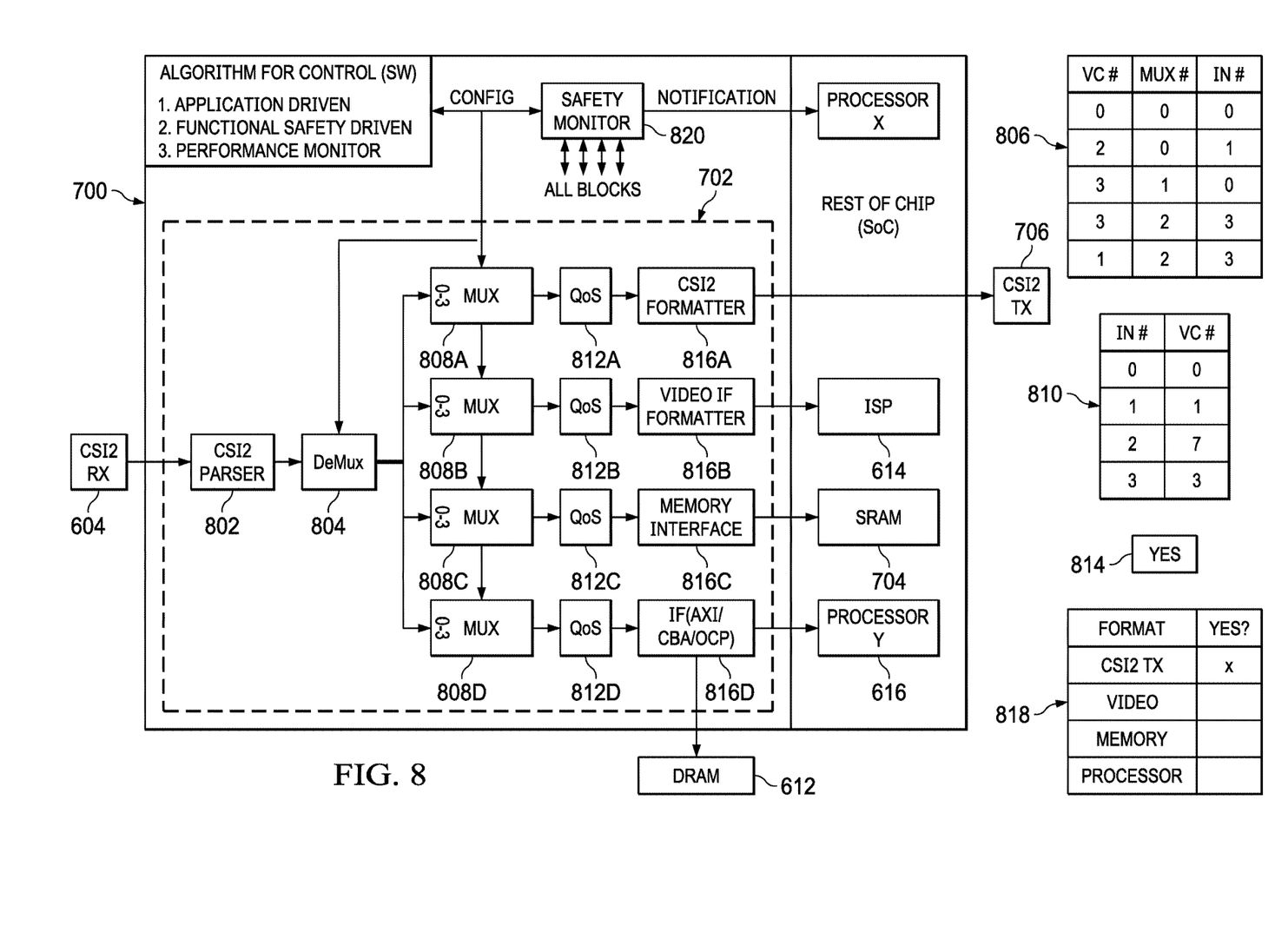
FIG. 8 is a block diagram and sensor data flow of the SoC of FIG. 7.

FIG. 8 is a block diagram of the hub subsystem 702, such as the CSI-2 receive module and hub 548. The CSI-2 RX module 604 provides its output sensor data stream to a CSI-2 parser 802, which analyzes the input CSI-2 sensor data stream that is received and determines the virtual channels that are present in the input sensor data stream. This allows the CSI-2 parser 802 to provide signals, such as a shim for each packet, to split the single physical stream to a series of physical streams based on the logical streams or individual device streams present in the received sensor data stream as defined by the virtual channel values. The output sensor data stream of the CSI-2 parser 802 is provided to a demultiplexer or demux 804 as a demultiplexer input sensor data stream. The demux 804 operates to provide a specified logical output sensor data stream of the CSI-2 parser 802 to various formatting chains based on the signals from the CSI-2 parser 802. For example, the demux 804 can include a table 806, which indicates the distribution of particular received virtual channels in the data stream. For example, the virtual channel 0 input sensor data stream can be routed to multiplexer or mux 0, input 0. Similarly, virtual channel 2, can be provided to multiplexer 0, input 1. Virtual channel 3 can be provided to both mux 1, input 0 and mux 2, input 3, showing that a single input logical sensor data stream can be distributed to multiple multiplexers for operation. The demux 804 performs the stream duplication task to provide individual sensor data streams to each mux at the same time. Virtual channel 1 can be provided to mux 2, input 3, with the demux 804 providing virtual channels 1 and 3 as a single physical sensor data stream. The demux 804 filters out any virtual channel not programmed into the table 806. While a table 806 is shown for explanatory purposes, individual registers can be provided to control the stream splitting and filtering operations of the demux 804.

While a single stream containing virtual channels, thus being considered to be incoming sensor data streams, is shown being received by the demux 804, multiple sensor data streams or channels, each with virtual channels, can be provided to the demux 804 in some examples. In such examples, table 806 may contain an additional column to specify the particular sensor data stream or channel.

The demux 804 is connected to a set of multiplexers 808A, 808B, 808C and 808D. The multiplexers 808A-D operate to redistribute or rename the input sensor data streams to the desired virtual channels. As indicated in a table 810, the input sensor data stream received at input 0 of multiplexer 808A is to be output as virtual channel 0. The input received sensor data stream at input 1 is to be provided as an output sensor data stream at virtual channel 1. The input sensor data stream from input 2 is provided in virtual channel 7. If multiple virtual channels are provided to a single mux input, the input number column is replaced by an input virtual channel value to specify the mapping between the input virtual channel and the output virtual channel. The output sensor data streams of the multiplexers 808A-D go to respective QoS or quality of service modules 812A-D. The QoS modules 812A-D each include a control bit 814, which indicates whether the particular sensor data stream is to be in operating in real-time or non-real-time mode. If operating in real-time mode, the QoS module 812A-D uses an included FIFO to provide buffering for real-time operation. The FIFO provides buffering real time operations with priority escalation of selected logical streams in case the FIFO level is getting full.

The output sensor data streams of the QoS modules 812A-D go to respective output blocks 814A, 814B, 816C and 86D. Each output block 86A-D includes a register as shown in table 88 to indicate the format of the particular output block. That way, by selecting the CSI-2 TX option in the table 88, the output block 86A is configured as a CSI-2 formatter to provide an output sensor data stream to the CSI-2 TX module 706. It is noted that while the output sensor data stream of the output block 86A is shown as connected to the CSI-2 TX module 706, this is not a direct connection but rather performed over the high-speed interconnect 508, so that the output sensor data stream of the output block 86A can be directed to different elements in the SoC 700, particularly any of the possible recipients of a sensor data stream. The illustrated output block 816B is configured to operate as a video interface formatter and is connected to the ISP block 614. The shown output block 816C is configured as a memory interface and is connected to onboard SRAM 704. The output block 816D is configured to operate with a processor and/or RAM and is connected to processor 616 and DRAM 612

Each output block 816A-D further includes data options relevant to the selected format, such as data width, strides, packing and the like. Therefore, the table 818 can be viewed as having additional entries for the particular format options. In an example, the table 818 is a register in each output block 816A-D, with the format options being additional registers. In this example, each output block 816A-D can perform any of the available formatting operations, increasing flexibility of the hub subsystem 702.

As the output sensor data streams of the output blocks 816A-D are provided over the high-speed interconnect 508, great flexibility for different sensors such as video or radar, is provided. For example, two different video sensor data streams can be formatted differently and provided to different processors.

This configuration including the demux 804 and muxes 808A-D provides flexibility to split and combine logical sensor data streams from the various sensors as desired. The demux 804 allows the input sensor data stream to be immediately split into the respective threads for operation, without being stored in the DRAM 612 first. In that manner, the ISP block 614 and the processor 616 do not access the DRAM 612 to obtain the data, so that data provided to them is timelier and DRAM 612 bandwidth is not used. The output blocks 816A-D perform sensor data stream reformatting appropriate for the selected recipient, further reducing processing time and thus timelines of the data processing.

A safety monitor 820, such as the safety MCU 304, 404 or MCU island 560, and any additional specific hardware, is connected to each of the demux 804, muxes 808A-D, QoS modules 812A-D, and output blocks 816A-D to monitor the output sensor data streams of each item for potential errors, such as packet or stream loss or errors, and the like. If an error is detected, an interrupt is provided and the MCU 304, 404 or MCU island 560 performs safety operations, examples of which are provided below.

Figure 9:
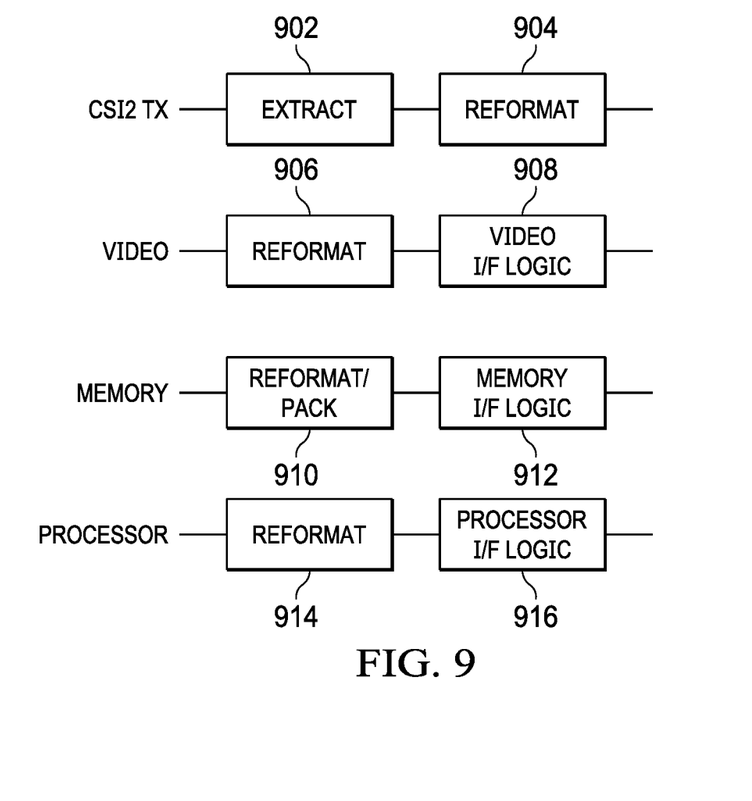
FIG. 9 is a block diagram of a system that performs for reformatting of the sensor data for different destinations.

As illustrated in FIG. 8, the output control block can have a series of different options on handling sensor data streams, options such as CSI-2 TX, video or image format, memory format and processor format. Referring to FIG. 9, if the control block is configured in CSI-2 transmit format, the output sensor data stream from the QoS block 812 is provided to an extract module 902, which extracts the desired virtual channels from the received input sensor data stream and provides output sensor data streams to a reformatter 904 to repackage them in appropriate CSI-2 format, with the desired output virtual channels, for provision to the CSI-2 TX module 706.

If the control block is configured for video or image operation, the output sensor data stream of the QoS block 812 is provided to a reformatter 906, which reformats the input sensor data stream from that provided according to the CSI-2 standard to the respective protocol for the video or ISP subsystem. The reformatted data is provided to a video interface logic block 908, which in turn is connected to the ISP block 614, for example.

If the data is to be provided to memory, the output block is configured to include a reformatter/pack module 910 to reformat the desired virtual channels and then pack or compress the data for storage in memory. The output sensor data stream of the reformatter/pack module 910 is provided to a memory interface logic block 912, which provides an output sensor data stream to the DRAM 612 to store data.

If the data is to be directly operated on by a processor, the data is provided to a reformat block 914 to develop the desired virtual channel sensor data stream for processing. After the reformat block 914, the data is provided to a processor interface logic block 916 for provision to the desired processor.

Figure 10:
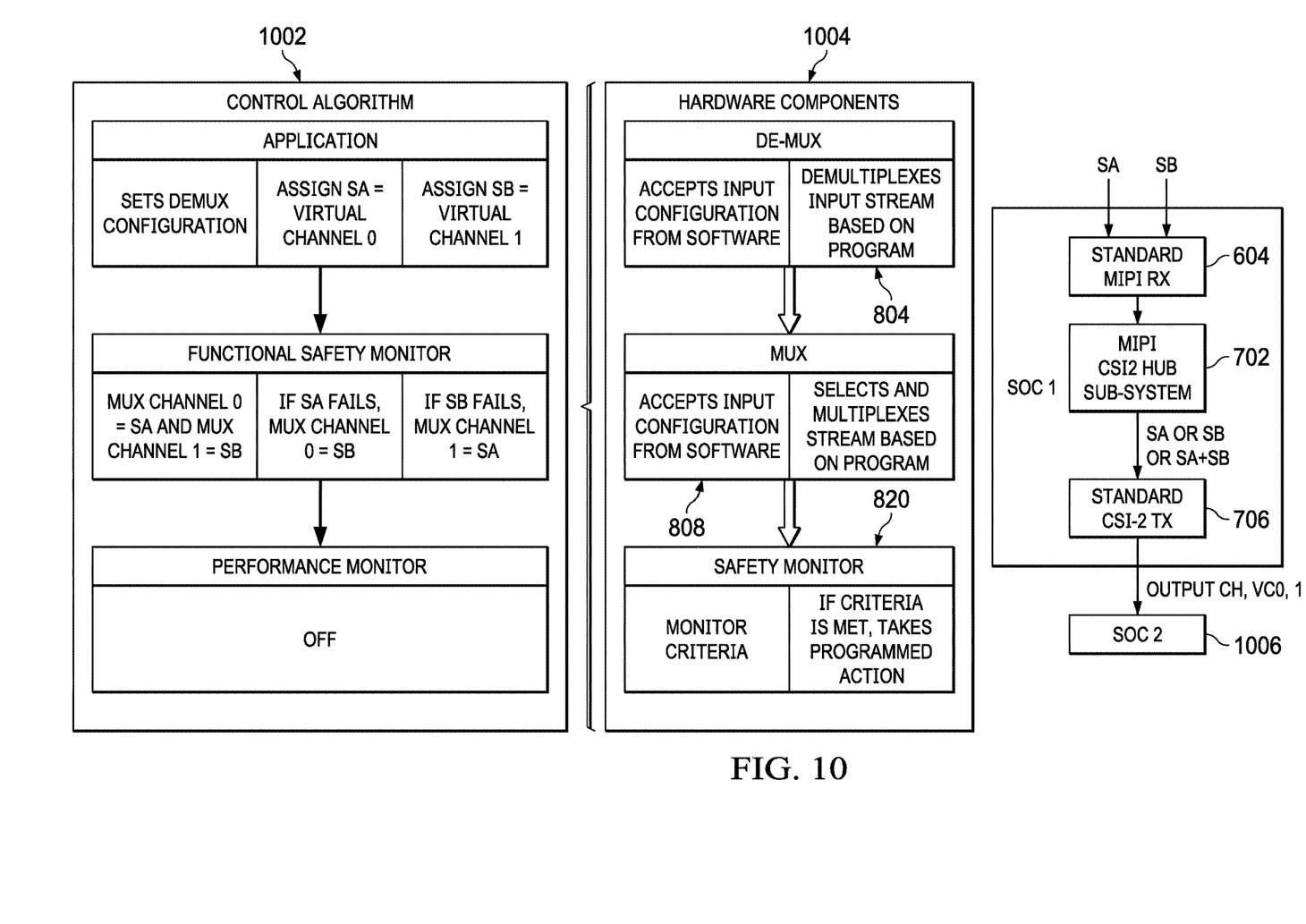
FIG. 10 is a diagram illustrating software and hardware operations and sensor data flow for a functional safety application of the SoC of FIG. 7.

FIG. 10 illustrates operation of some examples of the SoC 700. This illustration is for functional safety, where actions are taken to mitigate risk and damage during a failure. In the illustrated case, two optical input sensor data streams SA and SB are provided and should one of the input sensor data streams fail, the other of the stereo sensor data streams is provided to replace the failed data. The basic algorithm is illustrated in block 1002, which illustrates the basic algorithm for the illustration. As shown in an application section, in a first step, the demux 804 is set to be configured so that input sensor data stream SA is assigned to virtual channel 0 and input sensor data stream SB is assigned to virtual channel 1 and both are provided to two muxes 808. As shown in a Functional Safety Monitor section, the operation of the two sensor channels is then monitored, with the functional safety monitor 820 configured so that virtual channel 0 is assigned the sensor data stream SA and virtual channel 1 the sensor data stream SB. The default setting of the first mux 808 is to select the sensor data stream SA (i.e. virtual channel 0) and the default setting of the second mux 808 is to select the sensor data stream SB (i.e. virtual channel 1). Then, if the sensor data stream SA fails, the first mux 808 is reconfigured to select virtual channel 1, so that the sensor data stream SB is provided on the output. Similarly, if the sensor data stream SB fails, the second mux 808 is reconfigured to provide the sensor data stream SA as the output. A performance monitor section is unused in this functional safety example.

Alternatively, in another example, the sensor data streams SA and SB are provided to one mux 808, which provides sensor data stream SA on output virtual channel 0 and sensor data stream SB on output virtual channel 1. If sensor data stream SA fails, sensor data stream SB is duplicated, with the duplicate sensor data stream being provided as output virtual channel 0, replacing the normal sensor data stream SA. Similarly, if sensor data stream SB fails, sensor data stream SA is duplicated, and the duplicate is provided as output virtual channel 1.

This algorithm is reflected in the hardware block 1004. The demux 804 is configured to output the SA stereo sensor data stream as virtual channel 0 and the SB stereo sensor data stream as virtual channel 1 to the two muxes 808. Each mux 808 is configured based on the state of the particular virtual channels. For normal operation, the first mux 808 simply passes the SA sensor data stream as virtual channel 0 and second mux 808 passes the SB sensor data stream as virtual channel 1. Should a particular virtual channel or sensor data stream fail, then the demux 804 is reprogrammed by the functional safety monitor 820 to duplicate the remaining sensor data stream and provide the duplicated sensor data stream in place of the original stream. The relevant mux 808 is reprogrammed and the mux 808 then reformats the duplicated sensor data stream to have the virtual channel of the failed sensor data stream. Operation of the one mux 808, dual virtual channel input example is similar. A hardware block diagram is provided to illustrate the flow and operation in a block diagram format.

In this manner, functional safety is provided for the stereo sensor data streams SA and SB, so that at all times there are two sensor data streams being provided from the hub subsystem 702 to the CSI-2 TX module 706, so that the downstream SoC 1006 is always receiving to two sensor data streams, though they may be identical.

Figure 11:
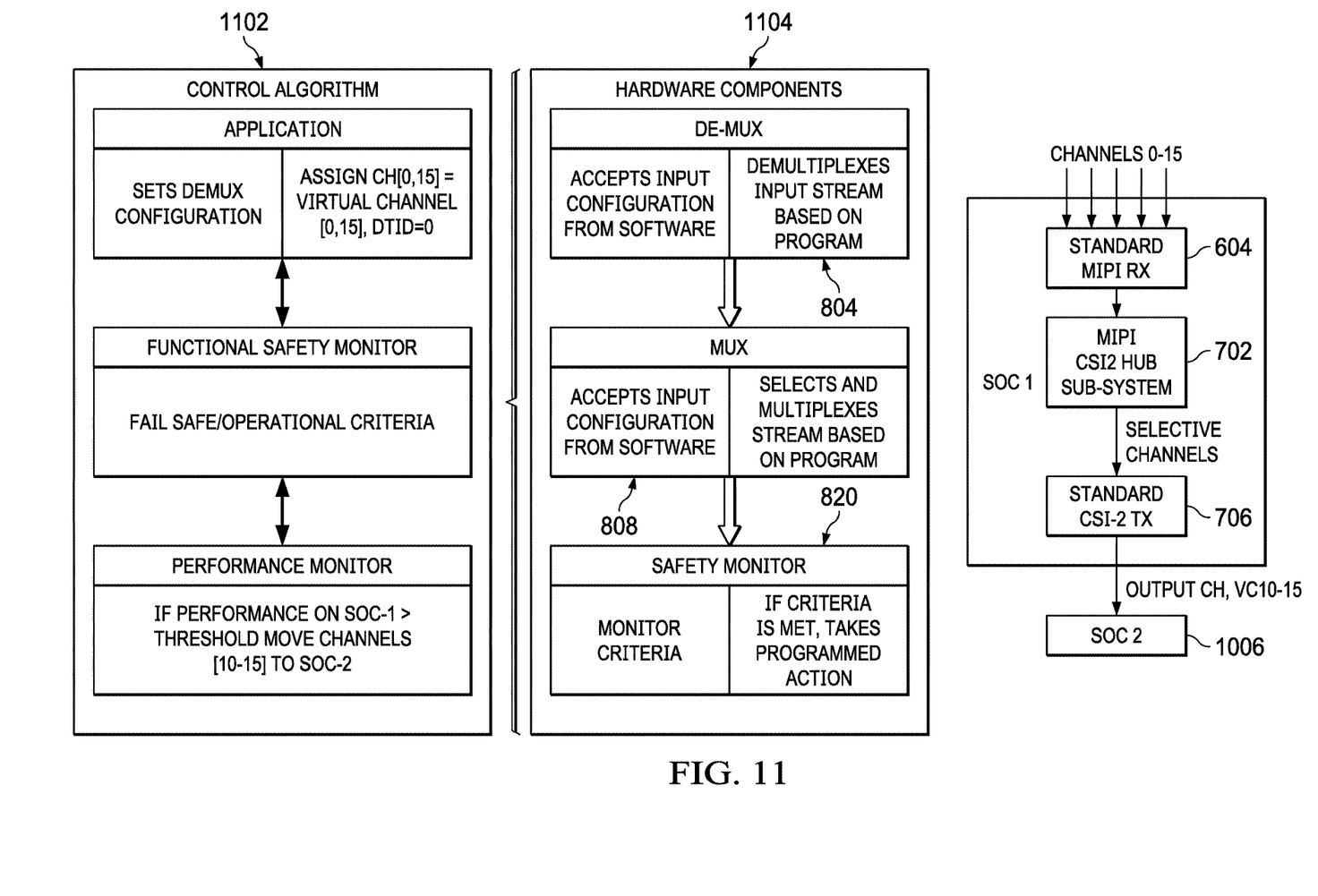
FIG. 11 is a diagram illustrating software and hardware operations and sensor data flow for an elastic processing application of the SoC of FIG. 7.

Depending upon the particular operation or location of the vehicle, if multiple systems present in a given SoC are operating, it may be possible that the SoC does not have the processing capability to properly process all of the incoming sensor data streams. In that case, some of the processing can be transferred to a different SoC with a lesser load. This is known as elastic processing and can be readily developed with the hub subsystem 702. Referring to Figure n, the basic algorithm is shown in block 1102, where the application assigns various input channels to various virtual channels for passage through the system. The performance monitor section, which in an example is the microprocessor 506 executing appropriate software, then determines that if the performance on the particular SoC is above given thresholds, then the sensor data streams of virtual channels 10 to 15 are transferred to use SoC 1006 for processing. The transfer of the data streams of the virtual channels 10-15 is done in the hardware components as shown in block 1104, where the demux 804 is configured to properly demultiplex the input channels to the proper muxes 808. If the SoC has the capability to handle all the channels, then the mux 808 is configured to multiplex the various sensor data streams that are received and provide each multiplexed sensor data stream to the proper configured output block for formatting and delivery to the recipient. If, however, the performance monitor indicates that particular channels or sensor data streams cannot be handled, the demux 804 is reprogrammed to provide these sensor data streams to a mux 808 that then combines the sensor data streams as virtual channels 10-15 and provides the output configured for CSI-2 operation to the CSI-2 reformatter 816, which provides its output sensor data streams to the CSI-2 TX module 706 for provision to the SoC 1006.

With this very flexible arrangement provided by the demux, muxes and output blocks, the SoC can be configured and reconfigured dynamically for various operations or functions as desired for the particular car.

Figure 12:
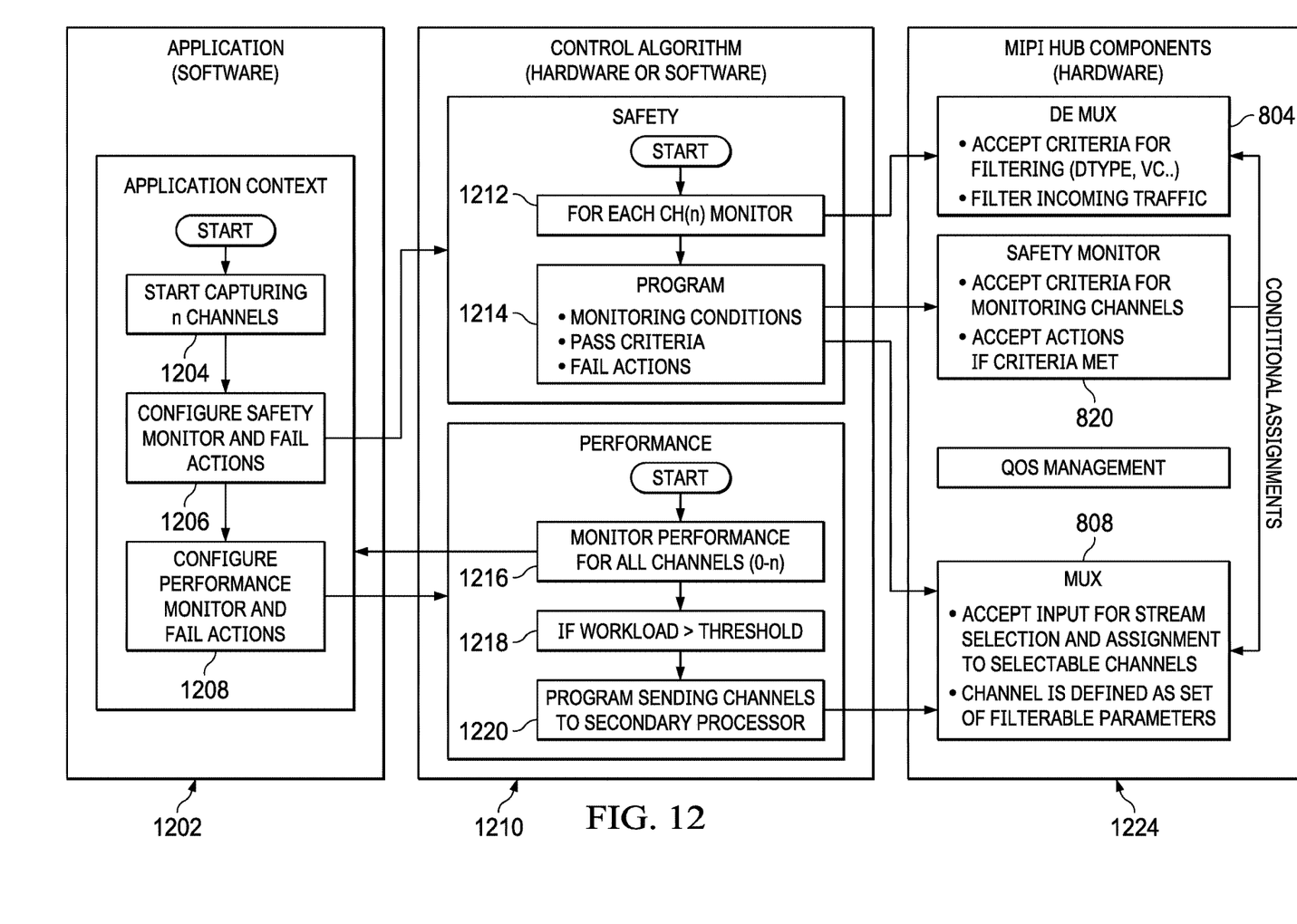
FIG. 12 is a diagram illustrating the general software and hardware operations of the SoC of FIG. 7.

FIG. 12 is a more general format of FIGS. 10 and 11. The application software 1202 determines in step 1204 the various channels or sensor data streams that are being received and the desired outputs. In step 1206 the fail actions for each of the relevant streams is determined and provided to the safety monitor 820. In step 1208, the performance parameters for the particular SoC are determined and provided to the performance monitor for application.

Block 1210 is the control algorithm, which may be done in hardware, software or a combination, by which the safety and performance properties or rules are applied. In step 1212, the particular channels selected are iterated through and the demux 804 is programmed for the proper filtering and demux operations. In step 1214 the particular safety monitoring conditions are determined and the pass criteria and fail operations are programmed into the safety monitor 820. In step 1216, the performance of the particular channels is monitored and in step 1218 a determination is made if a threshold has been exceeded and, if so, in step 1220 the muxes, and potentially the demux, are reconfigured to provide the relevant sensor data streams to the external SoC. Therefore, in the hub subsystem hardware 1224, the demux 804 has been properly configured to filter incoming sensor data streams and route the incoming sensor data streams to the appropriate muxes 808. The safety monitor and performance monitoring operations are performing as desired and the muxes 808 are operating according to the programmed operation. Should safety or performance events occur, the safety monitor 820 and the performance monitor properly reconfigure the demux 804 and the muxes 808 according to the provided rules.

The above description is intended to be illustrative, and not restrictive. For example, the above-described examples may be used in combination with each other. Many other examples will be upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A circuit for distributing sensor data streams to a plurality of recipients, the circuit comprising:
a demultiplexer that includes:
an input for receiving demultiplexer input sensor data streams; and
a set of outputs each for providing a respective subset of the demultiplexer input sensor data streams;
a plurality of multiplexers coupled to the demultiplexer, each of the plurality of multiplexers including:
an input coupled to a respective output of the set of outputs of the demultiplexer for receiving the respective subset of the demultiplexer input sensor data streams;
and
an output for providing a multiplexer output sensor data stream; and
a plurality of output blocks, each of the plurality of output blocks including:
an input coupled to the output of a respective multiplexer of the plurality of multiplexers for receiving the multiplexer output sensor data stream from the respective multiplexer as an output block input sensor data stream; and
an output for providing an output block output sensor data stream formatted for a recipient.

2. The circuit of claim 1, wherein the demultiplexer is configurable to provide a plurality of the demultiplexer input sensor data streams to a multiplexer of the plurality of multiplexers as multiplexer input sensor data streams, and
wherein the multiplexer is configurable to combine the received multiplexer input sensor data streams into a multiplexer output sensor data stream.

3. The circuit of claim 1, wherein the demultiplexer is configurable to provide a stream of the demultiplexer input sensor data streams to two different multiplexers at the same time.

4. The circuit of claim 1, wherein the demultiplexer input sensor data streams received at the demultiplexer include a plurality of individual sensor data streams allocated to different virtual channels.

5. The circuit of claim 4, wherein a multiplexer of the plurality of multiplexers is configurable to provide a plurality of individual sensor data streams allocated to different virtual channels on the multiplexer output sensor data stream, wherein the different virtual channels allocated by the multiplexer are different virtual channels for the individual sensor data streams than received by the demultiplexer for those individual sensor data streams.

6. The circuit of claim 1, wherein the recipients are at least two of an image signal processor, a processor and a memory.

7. The circuit of claim 6, wherein the demultiplexer input sensor data streams conform to an industry standard, and
wherein the recipients include a transmit module for providing a transmitter output sensor data stream according to the industry standard.

8. The circuit of claim 1, wherein the output of a multiplexer of the plurality of multiplexers is configurable to be directed to any of the plurality of recipients.

9. The circuit of claim 1, wherein each multiplexer of the plurality of multiplexers is configurable to operate with each of the plurality of recipients.

10. The circuit of claim 1, further comprising:
a parser coupled to the demultiplexer for receiving input sensor data streams and for providing parser output sensor data streams to the demultiplexer as the demultiplexer input sensor data streams, the parser validating the received parser input sensor data streams.

11. The circuit of claim 1, further comprising:
a plurality of quality of service modules coupled to the plurality of multiplexers and the plurality of output blocks, one quality of service module for each multiplexer and respective output block, each quality of service module for receiving the multiplexer output sensor data stream of the respective multiplexer as a quality of service module input sensor data stream and for providing a quality of service module output sensor data stream to the respective output block as the output block input sensor data stream.

12. A system comprising:
a system on a chip comprising:
a processor;
a digital signal processor;
a memory;
an external memory interface;
an interconnect coupled to and interconnecting the processor, digital system processor, memory and external memory interface;
a receiver module for receiving receiver module input sensor data streams and providing receiver output sensor data streams; and
a circuit coupled to the receiver module for distributing sensor data streams to a plurality of recipients, the circuit comprising:
a demultiplexer for receiving the receiver module output sensor data streams from the receiver module as demultiplexer input sensor data streams and providing the demultiplexer input sensor data streams as a plurality of demultiplexer output sensor data streams;
a plurality of multiplexers coupled to the demultiplexer, each multiplexer for receiving a respective subset of the demultiplexer output sensor data streams from the demultiplexer as multiplexer input sensor data streams and for providing a multiplexer output sensor data stream; and
a plurality of output blocks, one output block for each multiplexer, coupled to the respective multiplexer and for receiving the multiplexer output sensor data stream from the respective multiplexer as an output block input sensor data stream, each output block for providing an output block output sensor data stream formatted for a selected recipient.

13. The system of claim 12, wherein the demultiplexer is configurable to provide a plurality of the demultiplexer output sensor data streams to a single multiplexer as multiplexer input sensor data streams, and
wherein the single multiplexer is configurable to combine the multiplexer input sensor data streams into a single multiplexer output sensor data stream.

14. The system of claim 12, wherein the demultiplexer is configurable to provide a single stream of the demultiplexer output sensor data streams to two different multiplexers at the same time.

15. The system of claim 12, wherein the demultiplexer input sensor data streams received at the demultiplexer include a plurality of individual sensor data streams allocated to different virtual channels.

16. The system of claim 15, wherein a multiplexer is configurable to provide a plurality of individual sensor data streams allocated to different virtual channels on the multiplexer output sensor data stream, wherein the different virtual channels allocated by the multiplexer are different virtual channels for the individual sensor data streams than received by the demultiplexer for those individual sensor data streams.

17. The system of claim 12, the system on a chip further comprising:

at least two of an image signal processor, a processor and a memory, each of the at least two of an image signal processor, a processor and a memory coupled to the interconnect,
wherein the plurality of output blocks are coupled to the interconnect, and
wherein the at least two of an image signal processor, a processor and a memory are the recipients of the circuit.

18. The system of claim 12, the system on a chip further comprising:
a transmit module coupled to the interconnect for providing a transmit module output sensor data stream according to an industry standard,
wherein the receiver module input sensor data streams conform to the industry standard, and
wherein the transmit module is a recipient of the circuit.

19. The system of claim 18, further comprising:
a non-volatile memory external to said system on a chip and storing instructions that cause a processor on the system on a chip to perform steps of:
monitoring the performance of the system on a chip; and
directing at least one demultiplexer input sensor data stream received at the demultiplexer to be provided to the transmit module without being operated on by the system on a chip other than the circuit.

20. The system of claim 12, wherein the output of a multiplexer of the plurality of multiplexers is configurable to be directed to any of the plurality of recipients.

21. The system of claim 12, wherein each multiplexer of the plurality of multiplexers is configurable to operate with each of the plurality of recipients.

22. The system of claim 12, the system on a chip further comprising:
a parser coupled to the demultiplexer for receiving receiver output sensor data streams as parser input sensor data streams and for providing parser output sensor data streams to the demultiplexer, the parser validating the received parser input sensor data streams.

23. The system of claim 12, the system on a chip further comprising:
a plurality of quality of service modules coupled to the plurality of multiplexers and the plurality of output blocks, one quality of service module for each multiplexer and respective output block, each quality of service module for receiving the multiplexer output sensor data stream of the respective multiplexer as a quality of service module input sensor data stream and for providing a quality of service module output sensor data stream to the respective output block.

24. The system of claim 12, further comprising:
a non-volatile memory external to said system on a chip and storing instructions that cause a processor on the system on a chip to perform steps of:
monitoring the operations of the circuit for failures of a sensor data stream; and
upon determining the failure of a sensor data stream, configuring the demultiplexer and one of the plurality of multiplexers to duplicate another sensor data stream to be provided as an alternate to the failed sensor data stream.

* * * * *